United States Patent [19]

Goldsmith

[11] 4,054,724
[45] Oct. 18, 1977

[54] ISOTOPE HEATED DEFERRED ACTION THERMAL BATTERIES

[75] Inventor: Henry J. Goldsmith, Baltimore, Md.

[73] Assignee: Catalyst Research Corporation, Baltimore, Md.

[21] Appl. No.: 481,445

[22] Filed: Aug. 17, 1965

[51] Int. Cl.² .................................. H01M 6/36
[52] U.S. Cl. .................................. 429/5; 429/112
[58] Field of Search .............. 136/90, 202; 310/3, 310/4; 429/5, 112

[56] References Cited

U.S. PATENT DOCUMENTS

| | | | |
|---|---|---|---|
| 3,019,358 | 1/1962 | Ohmart | 429/5 |
| 3,189,485 | 6/1965 | Panzer | 429/5 |
| 3,347,711 | 10/1967 | Banks et al. | 136/202 |
| 3,575,714 | 4/1971 | Bennett et al. | 429/112 |
| 3,884,719 | 5/1975 | Evans et al. | 429/112 |

Primary Examiner—Edward A. Miller

EXEMPLARY CLAIM

1. A deferred action battery comprising:
   a thermal battery comprising a plurality of cells having a metallic positive electrode and a metallic negative electrode spaced by a normally inactive electrolyte that becomes electrically active when heated and a combustible composition for supplying heat to the electrolyte when ignited;
   a body containing radioactive isotope associated with thermal battery so that a major portion of the thermal energy generated by said isotope is not received by said thermal battery;
   first means for igniting said combustible composition to render said thermal battery functionally active;
   and second means movable to permit the said thermal battery to receive a major portion of the thermal energy generated by said isotope.

7 Claims, 1 Drawing Figure

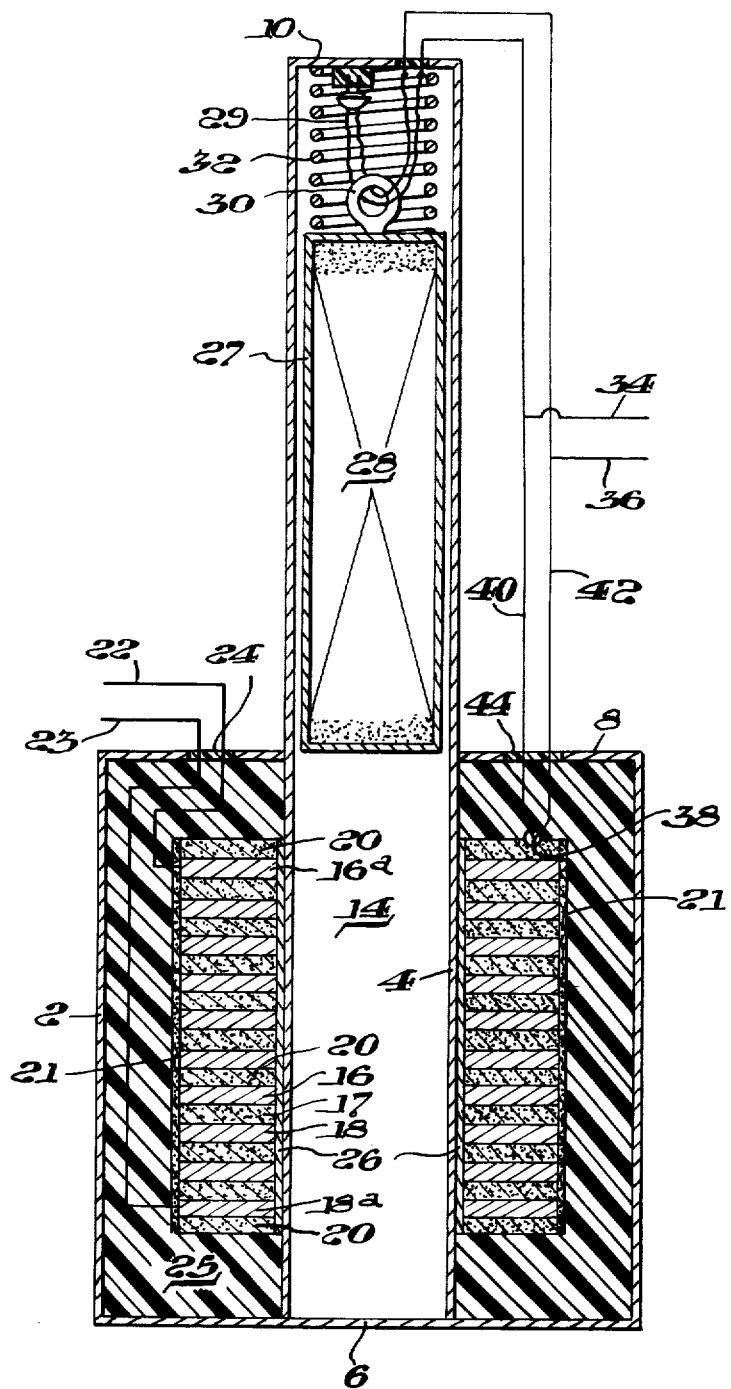

ISOTOPE HEATED DEFERRED ACTION THERMAL BATTERIES

This invention relates to deferred action batteries activated by heating, commonly referred to as thermal batteries, and more particularly to such batteries having an auxiliary radioactive isotope heating source.

Thermal batteries are formed of a plurality of cells consisting of a metallic positive electrode, a metallic negative electrode and a solid electrolyte inactive at low temperature together with a combustible composition that reacts exothermically on ignition to melt the electrolyte, thereby activating the battery. In conventional designs, the cells consist of a glass tape or pad impregnated with a fusible electrolyte, such as, for example, lithium and potassium halide eutectic mixtures, sandwiched between thin sheet metal electrodes; a pyrotechnic heat source, conventionally in the form of a pad of inorganic fiber impregnated with suitable oxidizer and fuel elements, for example, barium chromate and zirconium, is placed against a major surface of the individual cells. Hermetically sealed batteries contain a plurality of cells, suitably connected together in either series or parallel, and a combustible composition that evolves substantially no gas on burning. Ignition of the heat source is accomplished with ignition by the flame output of a percussion primer, electric match or the like.

Thermal batteries have found wide use in alarms, initiators, and weaponry because of their long shelf life, ruggedness, quick activation, and wide range of electrical properties. Their use has, however, been limited to applications where power is needed only for a short period of time since conventional thermal batteries are inherently short-lived due to the thermal control, that is, the activated hot battery cools rapidly, resolidifying the electrolyte and thereby deactivating the battery.

It is, therefore, an object of this invention to provide thermal batteries having an extended life. Other objects will be apparent from the following description and claims.

In accordance with this invention, a thermal battery is associated with a body of radioactive isotope so that no more than a minor amount of the thermal energy generated by the isotope is received by the battery and is provided with movable means that, when activated, permits the battery to receive a major amount of that thermal energy. Preferably the movable means is activated simultaneously with ignition of the combustible composition heat source. The quantity of isotope is preferably such that heat is provided at a rate equal to the rate of heat loss from the battery at its operating temperature. Inasmuch as only the thermal energy generated by the radioactive isotope is utilized in this invention, not the particle radiation, the body of radioactive isotope may be treated merely as a conventional hot body, i.e., the transmission of generated thermal energy to the battery may be adjusted by changing radiant, conductive and convective heat transfer by spacing, the use of thermal insulation, the control of convection currents and the like.

The accompanying drawing is a sectional view of a preferred embodiment of this invention.

Referring to the drawing, a housing having a tubular side wall 2, a tubular side wall of smaller diameter 4, an end wall 6, an annular end wall 8, and an end wall 10 forms a hermetically sealed toroidal battery chamber 12 and a central isotope chamber 14, a portion of which extends beyond the end of the battery chamber. The thermal battery, completely contained in chamber 12, has a plurality of cells, each consisting of a thin metal annular positive electrode 16 and negative electrode 18 spaced by an annular electrolyte pad 17, suitably glass cloth impregnated with a fusible electrolyte. Annular pads of combustible composition 20, suitably fibrous material impregnated with finely divided reactive metal and an inorganic oxidizer, are positioned at each end of the cell array and space each cell from adjacent cells. A strip of combustible composition 21, extends lengthwise of the cell array contacting each of the annular pyrotechnic elements. The cells are connected in series of parallel by electrical conductors, not shown. Power lead 22 connected to positive electrode 16a and power lead 23 connected to negative electrode 18a are hermetically sealed and insulated from the housing by insulator 24 and extend outside the housing for connection to a device to be operated by the battery. The battery elements are thermally and electrically insulated from the outside walls of the battery chamber by insulation 25 and electrically insulated from the inner wall by insulator 26.

A capsule 27, containing radioactive isotope material 28, suitably $Sr^{90}TiO_4$, is held in the portion of chamber 14 that extends beyond the battery chamber by retaining wire 29 that is connected to end wall 10 and passes through ring 30 on the capsule, compressing spring 32. Retaining wire 29 is preferably formed of a material that burns when an electric current is passed through it, such as Pyrofuse, a palladium clad aluminum wire.

The firing circuit has a power source and means to manually or automatically close the circuit (not shown) connected to leads 34 and 36. Parallel connected circuits are connected to the firing circuit for simultaneously activating the thermal battery and releasing the cartridge 26 when the firing circuit is closed. The battery activating circuit includes an electric match, or other electrical igniting device 38 contacting the pyrotechnic material, connected by leads 40 and 42 to the firing circuit, the leads being sealed and insulated from the housing by insulator 44. Leads 46 and 48 connected the firing circuit to the ends of retaining wire 29.

The heat generated by the isotope before the battery is activated is largely dissipated by radiation to the ambient from the portion of the chamber wall extending beyond the thermal battery. If desired, a portion of the side wall 6 outside the battery may be formed of a thermal insulating material, to minimize heat conduction to the battery.

In the operation of the battery, the firing circuits is closed activating the electric match 38 to ignite the pyrotechnic in the battery, thereby melting the electrolyte to quickly render the battery functionally active. Simultaneously, the retaining wire 29 burns, releasing cartridge 30 permitting spring 32 to move the cartridge down into the portion of chamber 14 inside the toroidal thermal battery. The heat supplied to the battery by the radioactive isotope in the cartridge is at least sufficient to equalize the heat loss from the battery to the ambient, thus maintaining the battery at a constant operative temperature for a prolonged period of time. Preferably the cartridge touches wall 6 so that heat is transferred to the thermal battery by both conduction and radiation.

To illustrate the effectiveness of this invention, a thermal battery 2 inches high × 1.85 inches OD having a calcium electrode, an iron electrode and a LiCl-KCl eutectic mixture electrolyte can deliver 0.1 amp. at 10 volts for 4 to 5 minutes. This represents only 3% of the electrical capacity of the battery. When such a battery is maintained at operating temperature (400°C.) for an indefinite time, an efficiency of better than 60% is obtained with a life of better than 90 minutes. Sufficient heat, about six watts, to maintain the battery at 400°C., is provided by only 6 cc. of $Sr^{90}TiO_4$, which can be contained in a small capsule. Thus, better than 20 times the electrical energy is available with no significant weight penalty. The radiation from such a heat source varies depending on the size of capsule and battery. A 6 cc. capsule unshielded would result in a dosage of 8 R. per hour.

Since the sealed thermal battery structure is isolated from the radioactive isotope and associated apparatus, none of the advantages of the thermal battery are lost. It will also be recognized that this invention is applicable to any thermal battery, many of which are well known. Anodes are generally magnesium or calcium and a wide variety of depolarizers or cathodically reactive chemicals that are reducible and thermally stable at operating temperatures are used, such as, for example, chromates, heavy metal salts and metallic oxides such as iron oxide, tungstic oxide, and vanadium pentoxide. Electrolytes are generally alkali metal halides, frequently eutectic mixtures of lithium halide and potassium halides, and may contain depolarizers or other constituents.

Examples of known thermal batteries are the calcium-silver battery described in U.S. Pat. No. 3,132,971, the magnesium-ferric oxide battery of U.s. Pat. No. 3,079,454, and the calcium-nickel battery of U.S. Pat. No. 3,055,960, and the magnesium-vanadium pentoxide battery of U.S. Pat. No. 2,999,122. A variety of pyrotechnic heat sources, generally consisting of a finely divided metal and inorganic oxidizer, are known, such as, for example, those disclosed by Bennett and Dubin in U.S. Pat. No. 2,457,860. The heat source is often a blend of zirconium metal fuel and barium chromate oxidizer.

Many modifications of this invention will be apparent to those skilled in the art. Thus, any releasable retaining means for the cartridge may be used to retain the isotope cartridge, such as, for example, a pin mechanism activated by a percussion power or electromagnetic field, or a fusible wire associated with a combustible cupristic to melt it. For long storage, it may be desirable to store the battery separately from the radioactive isotope and, in such case, the entire isotope cartridge, chamber and retainer may be made separable from the thermal battery.

It will be recognized that any radioactive isotope may be used in the practice of this invention, such as, for example, Strontium 90, Promethium 147 and Curium 244. Factors influencing the selection of a particular isotope for a particular application would include the half-life, radioactive dosage, thermal energy evolution, as well as price and commercial availability.

According to the provisions of the patent statutes, I have explained the principle and mode of practice of my invention and have described what I now consider to represent its best embodiment. However, I desire to have it understood that, within the scope of the appended claims, the invention may be practiced otherwise than as specifically described.

I claim:

1. A deferred action battery comprising:
   a thermal battery comprising a plurality of cells having a metallic positive electrode and a metallic negative electrode spaced by a normally inactive electrolyte that becomes electrically active when heated and a combustible composition for supplying heat to the electrolyte when ignited;
   a body containing radioactive isotope associated with thermal battery so that a major portion of the thermal energy generated by said isotope is not received by said thermal battery;
   first means for igniting said combustible composition to render said thermal battery functionally active;
   and second means movable to permit the said thermal battery to receive a major portion of the thermal energy generated by said isotope.

2. A battery according to claim 1 in which the first means and second means are activated simultaneously.

3. A deferred action battery comprising:
   a thermal battery comprising a plurality of cells having a metallic positive electrode and a metallic negative electrode spaced by a normally inactive electrolyte that becomes electrically active when heated and a combustible composition for supplying heat to the elecrolyte when ignited;
   a body containing radioactive isotope spaced from said thermal battery and oriented so that no more than a minor portion of the thermal energy generated by said isotope is received by said thermal battery;
   first means for igniting said combustible composition to render the battery functionally active;
   and second means for moving said body so that a major portion of the thermal energy generated by said isotope is received by the battery.

4. A deferred action battery comprising:
   a housing having first and second chambers;
   said first chamber being hermetically sealed and containing a thermal battery comprising a plurality of cells having a metallic positive electrode and a metallic negative electrode spaced by a normally inactive electrolyte that becomes electrically active when heated and a combustible composition for supplying heat to the electrolyte when ignited;
   said second chamber having a first portion adjacent said first chamber and a second portion remote from said first chamber;
   a body containing radioactive isotope positioned within said second chamber second portion;
   and means for moving said body to said second chamber first portion.

5. A deferred action battery comprising:
   a housing having a cylindrical first chamber and a toroidal second chamber surrounding one end portion of said first chamber, the other end portion of said first chamber extending beyond said second chamber, said first chamber having one end wall closing said one end portion and a second end wall closing said other end portion;
   said second chamber being hermetically sealed and containing a thermal battery comprising a plurality of cells having a metallic positive electrode and a metallic negative electrode spaced by a normally inactive electrolyte that becomes electrically active when heated and a combustible composition for supplying heat to the electrolyte when ignited;
   a cartridge containing a radioactive isotope;
   releasable retaining means holding said cartridge in said first chamber other end portion and resilient means compressed between said cartridge and said second end wall;

means to ignite said combustible composition;

and means releasing said retaining means whereby said resilient means will move said cartridge into said first chamber one end portion and against said first end wall.

6. A battery according to claim 5 in which the retaining means comprises a ring member secured to one end of said cartridge and a wire formed of a metal that disintegrates when an electric current is passed through it, said wire passing through said ring member and secured at both ends to a first chamber wall, and means for passing electric current through said wire.

7. A battery according to claim 6 having means to simultaneously activate said retaining means and said igniting means.

* * * * *